United States Patent
Castilla (10) Patent No.: US 11,941,596 B1
(45) Date of Patent: Mar. 26, 2024

(54) ELECTRONIC BANKING FACILITY

(71) Applicant: Citizens Bank of Edmond, Edmond, OK (US)

(72) Inventor: Jill Castilla, Edmond, OK (US)

(73) Assignee: Citizens Bank of Edmond, Edmond, OK (US)

( * ) Notice: Subject to any disclaimer, the term of this patent is extended or adjusted under 35 U.S.C. 154(b) by 499 days.

(21) Appl. No.: 16/800,770

(22) Filed: Feb. 25, 2020

Related U.S. Application Data (60) Provisional application No. 62/810,016, filed on Feb. 25, 2019.

(51) Int. Cl.
*G06Q 20/10* (2012.01)
*G06Q 20/40* (2012.01)
*G07C 9/00* (2020.01)
*G07F 19/00* (2006.01)

(52) U.S. Cl.
CPC ....... *G06Q 20/1085* (2013.01); *G06Q 20/409* (2013.01); *G07C 9/00174* (2013.01); *G07F 19/202* (2013.01); *G07F 19/203* (2013.01); *G07C 2009/00976* (2013.01)

(58) Field of Classification Search
None
See application file for complete search history.

(56) References Cited

U.S. PATENT DOCUMENTS

| | | | | |
|---|---|---|---|---|
| 6,086,471 A * | 7/2000 | Zimmermann | .......... | G07D 1/02 |
| | | | | 453/55 |
| 6,726,096 B1 * | 4/2004 | Green | ............. | G06Q 40/00 |
| | | | | 902/8 |
| 7,559,461 B2 * | 7/2009 | Crowell | ............. | G07F 19/203 |
| | | | | 455/418 |
| 7,854,378 B1 * | 12/2010 | Smith | ............. | G07F 19/201 |
| | | | | 235/379 |
| 7,900,829 B1 * | 3/2011 | Folk | ............. | G06Q 30/00 |
| | | | | 235/380 |
| 8,443,958 B2 * | 5/2013 | Blake | ............. | G07D 1/04 |
| | | | | 194/215 |
| 8,567,664 B2 * | 10/2013 | Goodwin | ............. | G07D 11/36 |
| | | | | 235/379 |
| 8,640,945 B1 * | 2/2014 | McCormick | ............. | G07D 11/34 |
| | | | | 235/379 |
| 8,984,509 B2 | 3/2015 | Kato | | |

(Continued)

*Primary Examiner* — Mohammad Z Shaikh
(74) *Attorney, Agent, or Firm* — DUNLAP CODDING, P.C.

(57) ABSTRACT

An electronic banking system having a host system comprising a processor and at least one first non-transitory computer readable medium storing a first set of instructions that when executed by the processor cause the processor to obtain and store banking records in a database, the banking records indicative of at least one bank account of a user. The electronic banking system further comprising a building having an internal space and a door providing selective access to the internal space. An interactive teller machine, a rolled coin machine, a recycler, and a drop box are located within the internal space of the building and connected to an interbank network. The rolled coin machine, recycler, and drop box are further connected to a network separate from the interbank network. An entry controller is programmed to allow selective access to the internal space through the door based on authentication of the user.

8 Claims, 7 Drawing Sheets

(56) References Cited

U.S. PATENT DOCUMENTS

| | | | | |
|---|---|---|---|---|
| 9,305,437 | B1* | 4/2016 | Koopman | G07F 19/203 |
| 9,373,228 | B2* | 6/2016 | Bentubo | G07D 11/0093 |
| 11,055,970 | B1* | 7/2021 | Curry | G07F 19/202 |
| 2006/0073883 | A1* | 4/2006 | Franks, Jr. | G07F 17/3251 |
| | | | | 463/25 |
| 2006/0283685 | A1* | 12/2006 | Cousin | G07D 1/02 |
| | | | | 194/217 |
| 2009/0239459 | A1* | 9/2009 | Watts | G07F 9/08 |
| | | | | 453/18 |
| 2009/0242626 | A1* | 10/2009 | Jones | G06Q 20/18 |
| | | | | 453/58 |
| 2009/0320106 | A1* | 12/2009 | Jones | G06Q 40/02 |
| | | | | 726/5 |
| 2011/0270695 | A1* | 11/2011 | Jones | G06Q 40/02 |
| | | | | 209/509 |
| 2015/0179025 | A1* | 6/2015 | Cowell | E04F 11/002 |
| | | | | 109/10 |
| 2016/0117893 | A1* | 4/2016 | Koopman | G07F 19/203 |
| | | | | 700/232 |
| 2017/0124813 | A1* | 5/2017 | Misener | G07D 3/00 |
| 2017/0337783 | A1* | 11/2017 | Konecny | G07F 19/211 |
| 2019/0197813 | A1* | 6/2019 | Nagai | G07F 19/203 |

\* cited by examiner

FIG. 11

ELECTRONIC BANKING FACILITY

INCORPORATION BY REFERENCE

The present patent application claims priority to a provisional patent application identified by U.S. Provisional Application No. 62/810,016 filed Feb. 25, 2019, the disclosure of which is incorporated herein by reference in its entirety.

BACKGROUND

Financial institutions use automate teller machines (ATM) to enable customers to perform financial transactions, such as cash withdrawals, deposits, transfer funds, or obtaining account information, at any time and without the need for direct interaction with bank staff. ATMs can be placed at any location but are often placed near or inside banks, shopping centers/malls, airports, railway stations, metro stations, grocery stores, petrol/gas stations, restaurants, and other locations.

Despite their convenience, ATMs suffer from several drawbacks. Currently, ATMs only allow a user to withdraw currency in bills, not coin, and only in limited denominations (most often $20). Further, the user must have a debit card to access the ATM. There is no secondary method of identifying a user. ATMs that accept cash deposits are generally limited in the amount they will allow a user to deposit at once and they will not accept coins. Further, because the ATM is not on the bank's network but rather connects through an ATM network processor, even cash deposits take time to be credited to a user's account. In addition, cash reliant businesses such as restaurants and bars, for instance, require the ability to deposit large quantities of bills and withdraw cash and coins in several different denominations in order to make change.

Therefore, a need exists for a system of electronic banking that solves the aforementioned problems while still providing the convenience of 24 hour a day access. It is to such an improved system that the presently disclosed inventive concepts are directed.

BRIEF DESCRIPTION OF THE SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The systems and methods as described in the present disclosure are capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

The term "bank" as used herein refers to a financial institution that can receive deposits, as well as provide withdrawals of deposited funds.

The term "bank account" as used herein refers to an arrangement with a bank whereby one can deposit and withdraw money and in some cases be paid interest.

Figure 1:
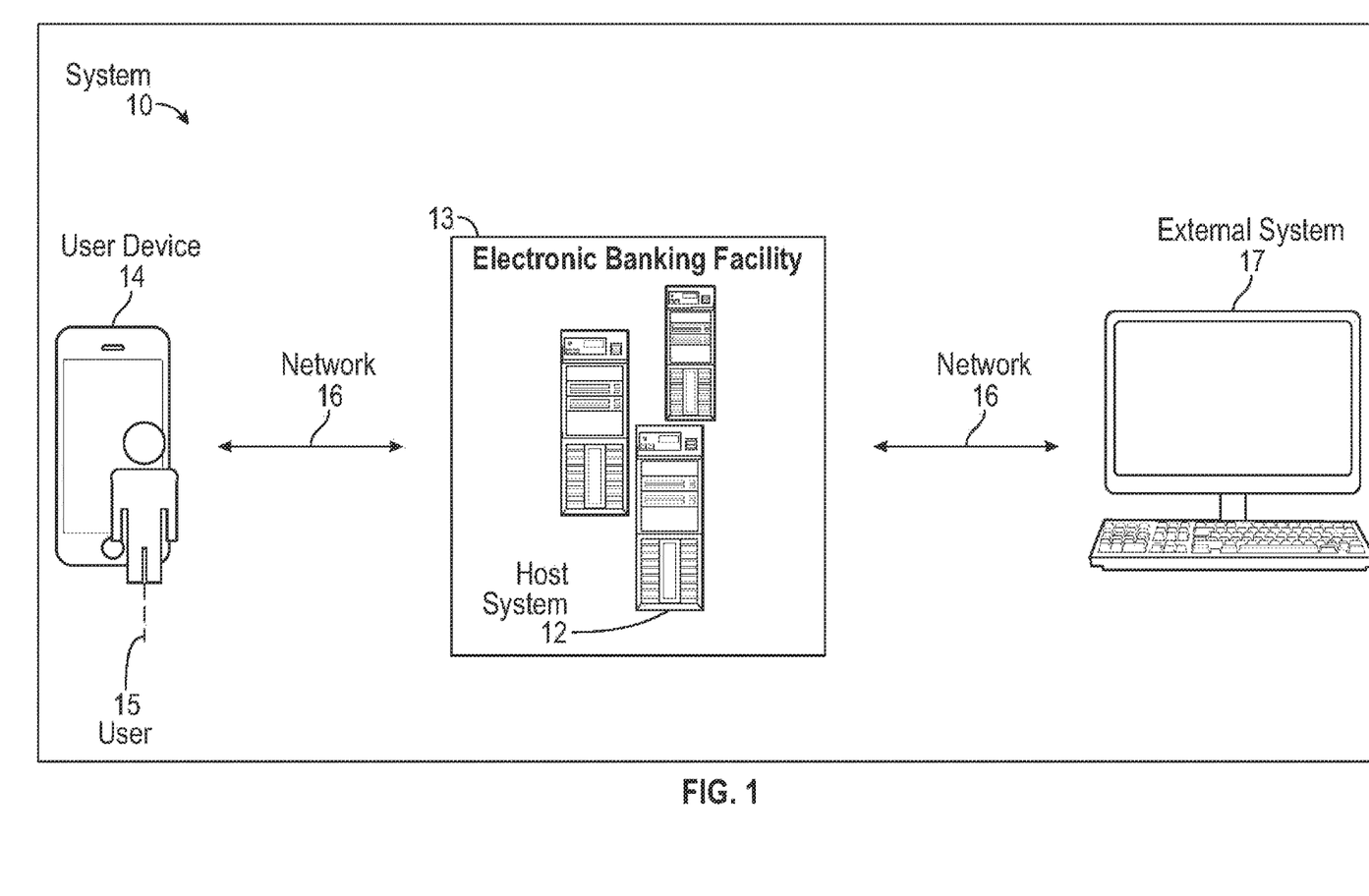
FIG. 1 is a diagrammatic view of hardware forming an exemplary embodiment of a system for electronic banking constructed in accordance with the present disclosure.

Referring now to the Figures, and in particular to FIG. 1, shown therein is a diagrammatic view of hardware forming an exemplary embodiment of a system 10 for electronic banking constructed in accordance with the present disclosure.

The system 10 is provided with at least one host system 12 (hereinafter "host system 12"), an electronic banking facility 13, a plurality of user devices 14 (hereinafter "user device 14"), and a network 16. In some embodiments, the system 10 may include at least one external system 17 (hereinafter "external system 17") for use by an administrator to add, delete, or modify user information, provide management reporting, or manage banking information. The system 10 may be a system or systems that are able to embody and/or execute the logic of the processes described herein. Logic embodied in the form of software instructions and/or firmware may be executed on any appropriate hardware. For example, logic embodied in the form of software instructions and/or firmware may be executed on a dedicated system or systems, on a personal computer system, on a distributed processing computer system, and/or the like. In some embodiments, logic may be implemented in a stand-alone environment operating on a single computer system and/or logic may be implemented in a networked environment such as a distributed system using multiple computers and/or processors as depicted in FIG. 1, for example.

The host system 12 of the system 10 may include a single processor or multiple processors working together or independently to perform a task. In some embodiments, the host system 12 may be partially or completely network-based or cloud based. The host system 12 may or may not be located in a single physical location. Additionally, multiple host systems 12 may or may not necessarily be located in a single physical location.

In some embodiments, the system 10 may be distributed, and include at least one host system 12 communicating with one or more user device 14 via the network 16. As used herein, the terms "network-based," "cloud-based," and any variations thereof, are intended to include the provision of configurable computational resources on demand via interfacing with a computer and/or computer network, with software and/or data at least partially located on a computer and/or computer network.

In some embodiments, the network 16 may be the Internet and/or other network. For example, if the network 16 is the Internet, a primary user interface of the system 10 may be delivered through a series of web pages or private internal web pages of a company or corporation, which may be written in hypertext markup language. It should be noted that the primary user interface of the system 10 may be another type of interface including, but not limited to, a Windows-based application, a tablet based application, a mobile web interface, and/or the like.

The network 16 may be almost any type of network. For example, in some embodiments, the network 16 may be a version of an Internet network (e.g., exist in a TCP/IP-based network). It is conceivable that in the near future, embodiments within the present disclosure may use more advanced networking technologies.

In some embodiments, the external system 17 may optionally communicate with the host system 12. For example, in one embodiment of the system 10, the external system 17 may supply data transmissions via the network 16 to the host system 12 regarding real-time or substantially real-time events (e.g., user updates, real-time banking updates, and/or banking account updates). Data transmission may be through any type of communication including, but not limited to, speech, visuals, signals, textual, and/or the like. Events may include, for example, data transmissions regarding user messages or updates from a bank manager, for example, initiated via the external system 17. It should be noted that the external system 17 may be the same type and construction as the user device 14.

Figure 2:
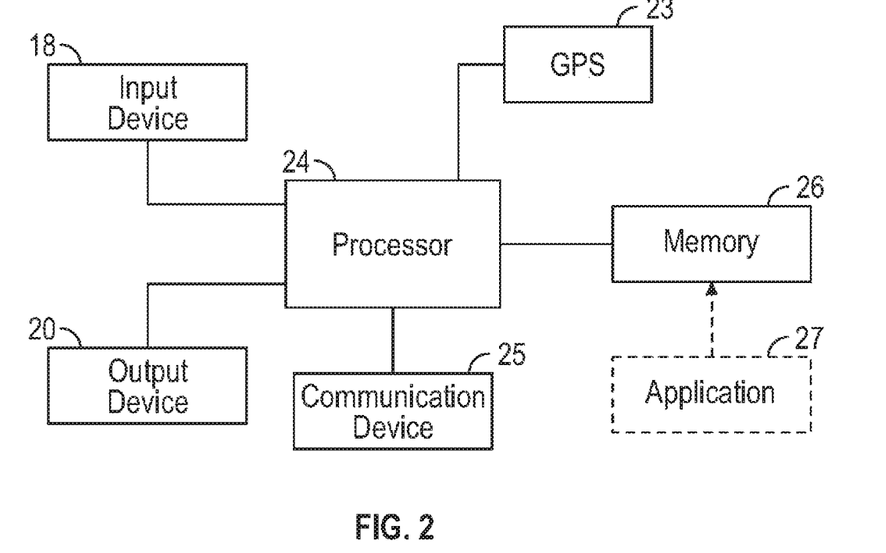
FIG. 2 is a diagrammatic view of an exemplary user device for use in the system for electronic banking illustrated in FIG. 1.

As shown in FIG. 2, the one or more user devices 14 of the system 10 may include, but are not limited to implementation as a cellular telephone, a smart phone, a tablet, a laptop computer, a desktop computer, a network-capable handheld device, a server, a wearable network-capable device, and/or the like.

In some embodiments, the user device 14 may include one or more input devices 18 (hereinafter "input device 18"), one or more output devices 20 (hereinafter "output device 20"), a device locator 23, one or more processors 24 (hereinafter "processor 24"), one or more communication devices 25 (hereinafter "communication device 25") capable of interfacing with the network 16, one or more non-transitory memory 26 (hereinafter "memory 26") storing processor executable code and/or software application(s), for example including, a web browser capable of accessing a website and/or communicating information and/or data over a wireless or wired network (e.g., network 16), and/or the like. The memory 26 may also store an application 27 that, when executed by the processor 24 causes the user device 14 to automatically and without user intervention collect information on the user's current location as determined by the device locator 23 to allow the user to access the electronic banking facility 13. In some embodiments, the application 27 is programmed to cause the processor 24 to provide a user input screen (not shown) to the output device 20, and to receive information from the user via the input device 18. Such information can be stored either temporarily and/or permanently in the memory 26 and/or transmitted to the host system 12 via the network 16 using the communication device 25 and may include, for instance, a personal identification number (PIN), a password, a digital access code, or the like.

Embodiments of the system 10 may also be modified to use any user device 14 or future developed devices capable of communicating with the host system 12 via the network 16.

The device locator 23 may be capable of determining the position of the user device 14. For example, implementations of the device locator 23 may include, but are not limited to, a Global Positioning System (GPS) chip, software based device triangulation methods, network-based location methods such as cell tower triangulation or trilateration, the use of known-location wireless local area network (WLAN) access points using the practice known as "wardriving", a hybrid positioning system combining two or more of the technologies listed above, or any future developed system or method of locating a device such as the user device 14.

The input device 18 may be capable of receiving information input from the user and/or processor 24, and transmitting such information to other components of the user device 14 and/or the network 16. The input device 18 may include, but are not limited to, implementation as a keyboard, touchscreen, mouse, trackball, microphone, fingerprint reader, infrared port, slide-out keyboard, flip-out keyboard, cell phone, PDA, remote control, fax machine, wearable communication device, network interface, an NFC enabled card, combinations thereof, and/or the like, for example.

The output device 20 may be capable of outputting information in a form perceivable by the user and/or processor 24. For example, implementations of the output device 20 may include, but are not limited to, a computer monitor, a screen, a touchscreen, a speaker, a website, a television set, a smart phone, a PDA, a cell phone, a laptop computer, combinations thereof, and the like, for example. It is to be understood that in some exemplary embodiments, the input device 18 and the output device 20 may be implemented as a single device, such as, for example, a touchscreen of a computer, a tablet, or a smartphone. It is to be further understood that as used herein the term user is not limited to a human being, and may comprise, a computer, a server, a website, a processor, a network interface, a human, a user terminal, a virtual computer, combinations thereof, and/or the like, for example.

The host system 12 may be capable of interfacing and/or communicating with the user device 14 and the external system 17 via the network 16. For example, the host system 12 may be configured to interface by exchanging signals (e.g., analog, digital, optical, and/or the like) via one or more ports (e.g., physical ports or virtual ports) using a network protocol, for example. Additionally, each host system 12 may be configured to interface and/or communicate with other host systems 12 directly and/or via the network 16, such as by exchanging signals (e.g., analog, digital, optical, and/or the like) via one or more ports.

The network 16 may permit bi-directional communication of information and/or data between the host system 12, the user device 14, and/or the external system 17. The network 16 may interface with the host system 12, the user device 14, and/or the external system 17 in a variety of ways. For example, in some embodiments, the network 16 may interface by optical and/or electronic interfaces, and/or may use a plurality of network topographies and/or protocols including, but not limited to, Ethernet, TCP/IP, circuit switched path, combinations thereof, and/or the like. For example, in some embodiments, the network 16 may be implemented as the World Wide Web (or Internet), a local area network (LAN), a wide area network (WAN), a metropolitan network, a 4G network, a 5G network, a satellite network, a radio network, an optical network, a cable network, a public switch telephone network, an Ethernet network, combinations thereof, and the like, for example. Additionally, the network 16 may use a variety of network protocols to permit bi-directional interface and/or communication of data and/or information between the host system 12, the user device 14 and/or the external system 17.

Figure 3:
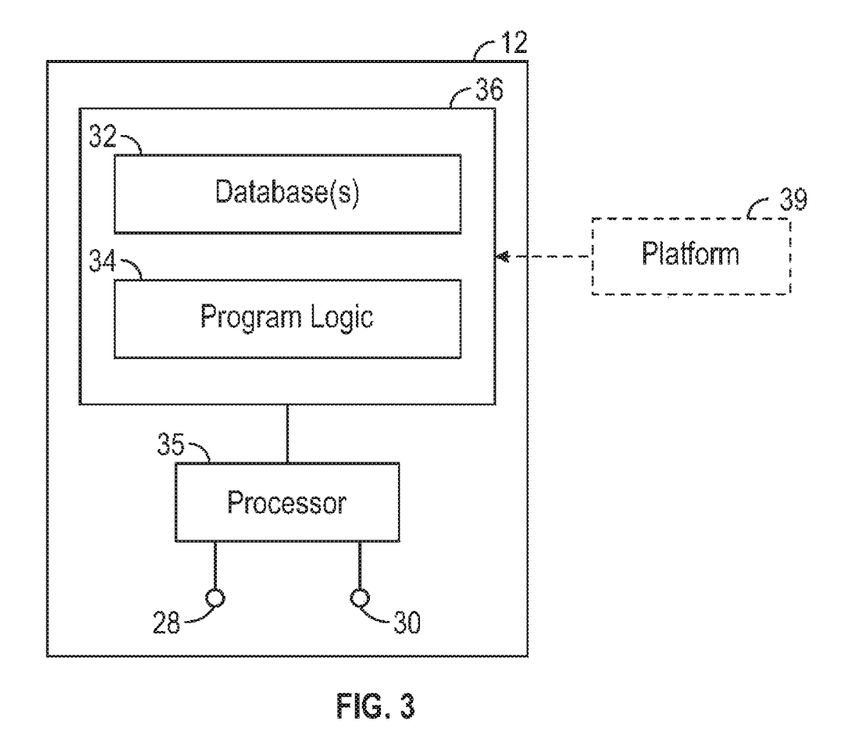
FIG. 3 is a diagrammatic view of an exemplary embodiment of a host system for use in the system for electronic banking illustrated in FIG. 1.

Referring now to FIG. 3, shown therein is a diagrammatic view of an exemplary embodiment of the host system 12. In the illustrated embodiment, the host system 12 is provided with one or more databases 32 (hereinafter "database 32"), program logic 34, and one or more processors 35 (hereinafter "processor 35"). The program logic 34 and the database 32 are stored on non-transitory computer readable storage memory 36 (hereinafter "memory 36") accessible by the processor 35 of the host system 12. It should be noted that as used herein, program logic 34 is another term for instructions which can be executed by the processor 24 or the processor 35. The database 32 can be a relational database or a non-relational database. Examples of such databases comprise, DB2®, Microsoft® Access, Microsoft® SQL Server, Oracle®, mySQL, PostgreSQL, MongoDB, Apache Cassandra, and the like. It should be understood that these examples have been provided for the purposes of illustration only and should not be construed as limiting the presently disclosed inventive concepts. The database 32 can be centralized or distributed across multiple systems.

The database 32 stores account information for each user of the financial institution. Account information may include, but is not limited to, name, address, phone number, account number, PIN number associated with the account, current balance, pending transactions, and the like. Such databases and accounts are well known and understood in the financial industry. Thus, it is believed that the term account or user account should be understood by one of skill in the art without further explanation.

In some embodiments, the host system 12 may comprise one or more processors 35 working together, or independently to, execute processor executable code stored on the memory 36. Additionally, each host system 12 may include at least one input device 28 (hereinafter "input device 28") and at least one output device 30 (hereinafter "output device 30"). Each element of the host system 12 may be partially or completely network-based or cloud-based, and may or may not be located in a single physical location.

The processor 35 may be implemented as a single processor or multiple processors working together, or independently, to execute the program logic 34 as described herein. It is to be understood, that in certain embodiments using more than one processor 35, the processors 35 may be located remotely from one another, located in the same location, or comprising a unitary multi-core processor. The processors 35 may be capable of reading and/or executing processor executable code and/or capable of creating, manipulating, retrieving, altering, and/or storing data structures into the memory 36.

Exemplary embodiments of the processor 35 may include, but are not limited to, a digital signal processor (DSP), a central processing unit (CPU), a field programmable gate array (FPGA), a microprocessor, a multi-core processor, combinations, thereof, and/or the like, for example. The processor 35 may be capable of communicating with the memory 36 via a path (e.g., data bus). The processor 35 may be capable of communicating with the input device 28 and/or the output device 30.

The processor 35 may be further capable of interfacing and/or communicating with the user device 14 and/or the external system 17 via the network 16. For example, the processor 35 may be capable of communicating via the network 16 by exchanging signals (e.g., analog, digital, optical, and/or the like) via one or more ports (e.g., physical or virtual ports) using a network protocol to provide updated information to the application 27 executed on the user device 14 such as, for instance, access to an electronic banking facility 13 at or near the user's current location.

The memory 36 may be capable of storing processor executable code. Additionally, the memory 36 may be implemented as a conventional non-transitory memory, such as for example, random access memory (RAM), CD-ROM, a hard drive, a solid state drive, a flash drive, a memory card, a DVD-ROM, a disk, an optical drive, combinations thereof, and/or the like, for example.

In some embodiments, the memory 36 may be located in the same physical location as the host system 12, and/or one or more memory 36 may be located remotely from the host system 12. For example, the memory 36 may be located remotely from the host system 12 and communicate with the processor 35 via the network 16. Additionally, when more than one memory 36 is used, a first memory 36 may be located in the same physical location as the processor 35, and additional memory 36 may be located in a location physically remote from the processor 35. Additionally, the memory 36 may be implemented as a "cloud" non-transitory computer readable storage memory (i.e., one or more memory 36 may be partially or completely based on or accessed using the network 16).

The input device 28 of the host system 12 may transmit data to the processor 35 and may be similar to the input device 18 of the user device 14. The input device 28 may be located in the same physical location as the processor 35, or located remotely and/or partially or completely network-based. The output device 30 of the host system 12 may transmit information from the processor 35 to a user, and may be similar to the output device 20 of the user device 14. The output device 30 may be located with the processor 24, or located remotely and/or partially or completely network-based.

The memory 36 may store processor executable code and/or information comprising the database 32 and program logic 34. In some embodiments, the processor executable code may be stored as a data structure, such as the database 32 and/or data table, for example, or in non-data structure format such as in a non-compiled text file.

Figure 4:
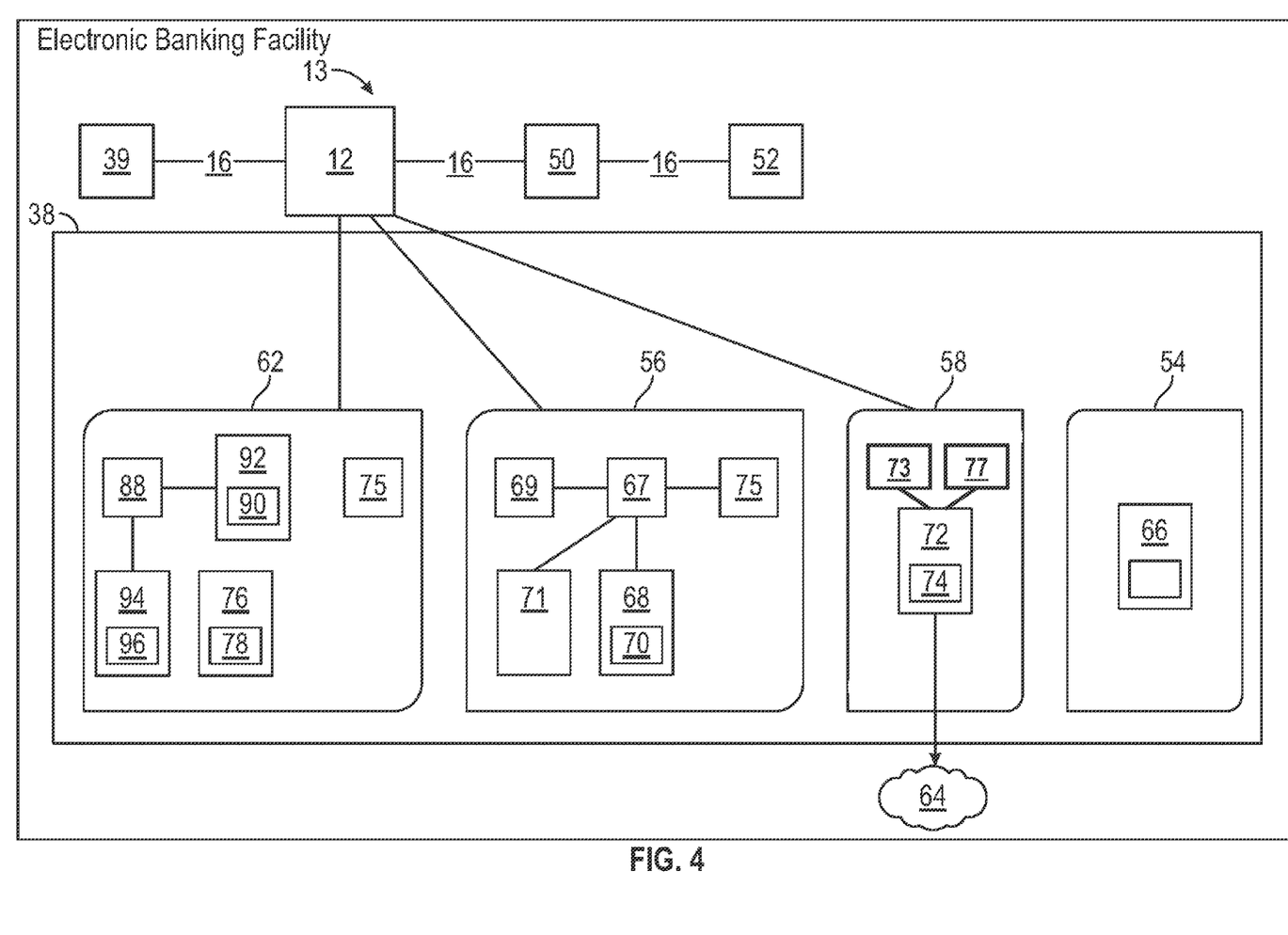
FIG. 4 is a diagrammatic view of hardware and software forming an exemplary electronic banking facility in accordance with the present disclosure.
Figure 5:
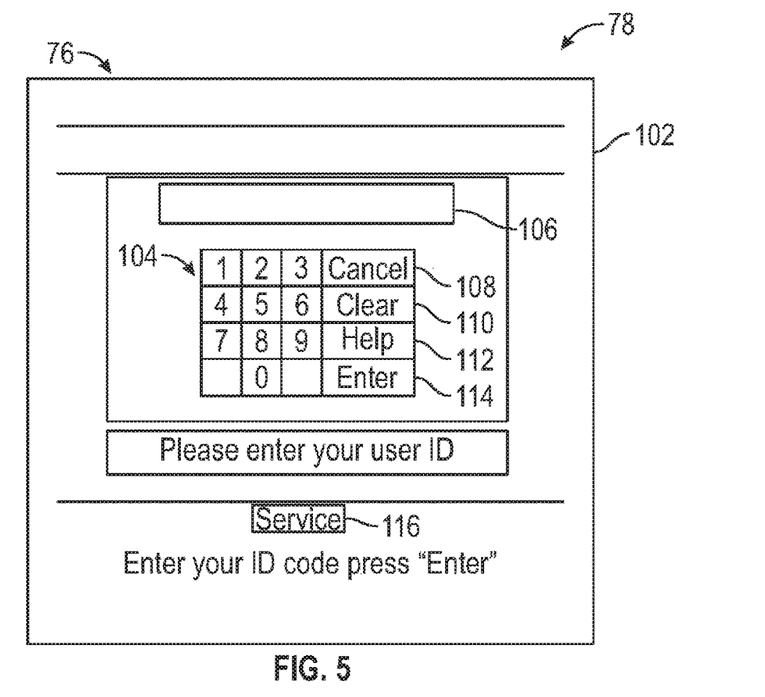
FIG. 5 is an exemplary login screen that may be displayed on an input/output device of a recycler in accordance with one embodiment of the electronic banking facility of FIG. 4.

Referring now to FIG. 4, the electronic banking facility 13 will house equipment in order to process transactions normally available only at a staffed banking location. The electronic banking facility 13 includes a building 38. Exemplary equipment may include the host system 12 running software 39, entry control 50 which may include entry controller 52, a drop box 54, rolled coin dispenser 56, an interactive teller machine 58 connected to an interbank network 64, and a recycler 62. In addition, building 38 enclosing the electronic banking facility 13 will serve as a hub for events and/or meetings between bank personnel and customers.

For the purposes of security, the building 38 housing portions of the electronic banking facility 13 may be provided with selective entry control via the entry control 50. In some embodiments, the entry control 50 may control access to the electronic banking facility 13 through a door (not shown) that only opens when a customer inserts their debit card in the entry controller 52 or uses Near Field Communication (NFC) adjacent to the entry controller 52 and enters a PIN, for instance, to indicate that they are a customer. In another embodiment, a plurality of different customers who wish to access the facility will be granted access via the application 27 installed on the user device 14 that allows electronic entry through the door. In such an embodiment, to further control access to the electronic banking facility 13, customers may be required to call customer service/operations during business hours and provide verification information before they are allowed to download the application 27 and gain access to the electronic banking facility 13 via the application 27. Once the application 27 has been downloaded and installed on the customer's user device 14, the application 27 may be used to authenticate the customer before allowing electronic entry though the door.

It should be noted that employees and or service personnel may enter the electronic banking facility 13 by using a key or the application 27 if they have been assigned a license. In some embodiments, the application 27 may allow authorized personnel to provide remote access to the banking facility 13. For instance, when a customer has forgotten their debit card and/or user device 14, the user may contact a bank representative who may authenticate the customer and provide access to the banking facility by remotely opening the door or providing a temporary code that can be entered into the entry controller 52.

Drop box 54 may be provided to allow customers to deposit after hours. Drop box 54 may be provided with a sensor 66 configured to cause the drop box 54 to send an alert when the drop box 54 has been opened, for instance. In an exemplary embodiment, drop box 54 is provided with circuitry configured to receive the signal from the sensor 66, and send an email or text message to an employee when the sensor 66 has been triggered indicating that personnel will need to go collect the deposit. It should be noted that email and text messaging have been used by way of illustration only and any alert system may be used.

Rolled coin dispenser 56 is configured to allow the user to purchase rolls of coins or bundled paper currency in selected amounts and denominations using user device 14. Rolled coin dispenser 56 is provided with a control unit 67, an input/output device 68 (such as a touchscreen), a reader 69, a user interface 70 displayed on the input/output device 68, and a dispenser 71. The reader 69 is an optional part of the rolled coin dispenser 56 that is a device configured to read the user device 14. The user device 14 can be a credit card, a debit card, a smart phone or the like that supplies one or more unique code(s) (hereinafter referred to as a "unique code") that can enable an electronic transaction. The unique code from the user device 14 is read by the reader 69 and supplied to the control unit 67. The user interface 70 allows the user to select transaction information, including but not limited to, user identification information (e.g. a password, pin code or the like), a desired denomination or denominations, a number of rolls for each denomination, and a complete transaction indicator to indicate when the user is prepared to purchase the selected roll(s) of coins.

The rolled coin dispenser 56 is connected to the host system 12 such that the purchase of rolled coins in selected denominations or bundled paper currency in selected denominations using the user's debit card, or mobile application 27, for example, may be processed as an electronic transaction. When the debit card (or mobile application 27) is issued by a financial institution that controls the electronic banking facility 13, the transaction may be recorded via the host system as a debit transaction on the user's bank account that instantly debits the amount from the user's bank account as opposed to a standard file transmission process which happens using the interbank network 64. If the user uses a credit card or debit card not issued by the financial institution that controls the electronic banking facility, the transaction will be processed through the interbank network 64, and show up on the statement of the financial institution that issued the credit/debit card.

The control unit 67 receives the transaction information, and the unique code from the transaction device, and supplies the transaction information and the unique code to the host system 12 to enable the host system 12 to process the electronic transaction. Upon the host system 12 authorizing the electronic transaction, the host system 12 sends one or more control signal to the control unit 67 of the rolled coin dispenser 56 to cause the dispenser 71 of the rolled coin dispenser 56 to dispense the desired denomination(s) and number(s) of the rolled coin or bundled paper currency. The dispenser 71 includes a housing including a cavity to hold the denomination(s) and number(s) of the rolled coin and bundled paper currency, and one or more gate or actuator within the housing for each denomination of rolled coin and bundled paper currency to dispense the rolled coin and bundled paper currency. In some embodiments, the dispenser 71 includes an elevator system having a platform adapted to receive the desired rolled coin or bundled paper currency, and convey the rolled coin or bundled paper currency to an outlet for pickup by the user. The control unit 67 may communicate with and control the elevator system, and the gates or actuators.

The connection to the host system 12 also allows bank personnel to remotely diagnose and repair problems such as running monthly scans to detect viruses or the presence of malware on the rolled coin dispenser 56. Further, inventory of the rolled coin dispenser 56 may be remotely monitored and settlements and reports for card transactions may be remotely run. In one embodiment, the dispensed rolled coin is recorded directly to a general ledger within the database 32 of the host system 12. When reconciling, the previous inventory—any purchased transactions should equal the current inventory documented within the software.

Interactive teller machine 58 is provided with an input/output device 72 (such as a touchscreen) and a user interface 74 displayed on the input/output device 72 that allows the user perform various automated transactions such as cash withdrawal, deposits, balance inquiry, check cashing, and balance transfers, for example. The interactive teller machine 58 may be provided with various features such as a video camera 73 near eye-level, a sound system 77, a pad for signatures (not shown), an identification scanner (not shown), a coin dispenser (not shown), and live chat or a phone handset for private communication with bank personnel (such as a teller) (not shown).

The user interface 74 of the interactive teller machine 58 allows the user to interact with the teller "face-to-face" via the video camera 73 and sound system 77 delivering an assisted self-service experience. For instance, if a user has a question about their account, the user may select a button on the user interface 74 programmed to connect the user to the teller located in a remote location via a video chat. Further, because the user and teller can communicate in real-time, if a user forgot their debit card, the video chat feature and identification scanner allow the teller to identify the user and authorize a transaction.

The interactive teller machine 58 is connected to the interbank network 64 which allows users to withdraw and deposit money from machines not belonging to the financial institution where the user has their accounts or in the countries where the user's accounts are held (enabling cash withdrawals in local currency). Some examples of interbank networks include NYCE, PULSE, PLUS, Cirrus, AFFN, Interac, Interswitch, STAR, LINK, MegaLink, and BancNet. While providing convenience, it should be noted that the interbank network 64 is not directly linked to the financial institution associated with the electronic banking facility 13.

The recycler 62 includes a control circuit 75 that provides users direct access to their account through the host system 12 for cash and coin deposits and/or withdrawals in addition to performing currency exchanges. To facilitate these transactions, the recycler 62 is also provided with an input/output device 76 (such as a touchscreen) and a user interface 78 including circuitry to provide information to the control circuit 75 thereby allowing a plurality of distinct users to separately perform a desired transaction. Although the user interface 78 may be configured to allow a plurality of users to separately perform a desired transaction, the following description will use the singular terminology "user" as an example. Interaction with the user interface 78 via the input/output device 76 allows the user to perform the desired transaction such as deposit or withdrawal of cash and/or coins. When withdrawing cash, the circuitry of the user interface 78 is configured to allow the user to select a withdrawal amount, e.g., $2,000, and a number of bank notes for each denomination. In this example, the user interface 78 may present a first field where the user can select a denomination of bank note, and a second field where the user can select a number of bank notes for the denomination. In this example, the user may select a $100 bank note, and 20 of such bank notes. In other examples, the circuitry of the user interface 78 is configured to permit user selection of more than one denomination of bank note, and a number of bank notes for each selected denomination. Once the user has selected a withdrawal amount, denomination(s), and number of bank notes, this information is provided to the control circuit 75 to provide instructions to the database 32 of the host system 12 to effect a debit of the user's bank account. The control circuit 75 may communicate with and control the user interface 74, the input/output device 76, the counter 92, and the cash dispenser 94. Further, the control circuit 75 may communicate with the host system 12 to effect the deposits, and withdrawals discussed herein.

The recycler 62 may accept currency in bundles of a predetermined amount, such as up to 300 notes, and any mixture of coins which saves time on manual counting and verification. Because the recycler 62 is connected directly to the host system 12, or, in other words, directly to the account of the user over what is referred to in the industry as a core network, any deposited cash may be credited to the user's account during the same working day. This may be contrasted with cash deposited in a machine such as the interactive teller machine 58 which is connected to the interbank network 64 which requires at least one business day for a cash deposit to be made available in a user's account. Further, such a deposit may be subject to a transaction fee for the use of the interbank network 64.

Because the recycler 62 may be configured to accept currency in large bundles and is directly connected to the core network, the recycler 62 allows larger cash deposits and withdrawals than a normal ATM machine. Generally, ATMs rely on authorization of a financial transaction by the card issuer or other authorizing institution over the interbank network 64. Because account information updates may be delayed over such a network, large cash withdrawals are generally not allowed because the user may withdraw more money than is available in their bank account before an update can occur. Financial institutions limit this risk by limiting withdrawal amounts. Because the recycler 62 may be directly connected to the financial institution via the core network (and may not be connected to the interbank network), the recycler 62 can query the database 32 so that the financial institution can be certain that the user's bank account is up to date and the funds are available for withdrawal prior to authorizing a transaction. In this regard, the recycler 62 and the database 32 of the host system 12 may be configured to permit a withdrawal that is only limited by the available balance in the user's bank account, and the inventory of cash within the recycler 62.

Further, withdrawals from the recycler 62 are not limited to a single denomination as discussed above, which allows cash reliant businesses such as a restaurant, for instance, to access cash in various denominations 24 hours a day, 7 days a week.

Because the recycler 62 has a communication device directly connected to the host system 12, cash levels may be remotely monitored and tracked to ensure serviceable levels of all denominations are available. The recycler 62 is a machine that authenticates incoming bank notes and securely stores the bank notes in an internal vault 88. The recycler 62 may have an input bin 90 for receiving the bank notes, and a counter 92 having sensors that count and evaluate the bank notes for fitness, authenticity, and denomination, and a conveyor then conveys the bank notes into the vault. The recycler 62 also includes a cash dispenser 94 that transfers bank notes from the internal vault 88 to an output bin 96. In accordance with the present disclosure, the recycler 62 includes the input/output device 76 (such as a touchscreen) and the user interface 78 which includes circuitry configured to authenticate a non-teller user, e.g., a bank customer by accessing authentication information based upon the bank account records within the database 32, and establishing the deposits and withdrawals described above. For example, the user interface 78 may receive a user name and password from the user, and then query the database 32 to determine whether the user name and password identify a valid bank account within the database 32. In additional embodiments, the user may be authenticated using a debit card with NFC via the input/output device 76 or a code generated via mobile banking application 27. If the user uses a credit card or debit card not issued by the financial institution that controls the electronic banking facility 13, the transaction will be processed through the interbank network 64 and show up on the statement of the financial institution that issued the credit/debit card or may be processed via an ACH transaction from the bank to the non-bank customer's financial institution.

Referring now to FIGS. 5-11, the recycler 62 can be used as follows. First, the user logs into their account using login screen 102 of user interface 78 displayed on the input/output device 76. This can be accomplished by providing an account number as a user id, for instance, followed by a password or pin code entered into an input box 106 of the user interface 100 using keypad 104. User interface 78 may be provided with a cancel button 108 programmed to cancel the current transaction, a clear button 110 programmed to delete the last character entered, a help button 112 programmed to provide instructions on the current action, an enter button 114 programmed to indicate completion of the current action, and a service button 116 configured to indicate service of the recycler 62 is needed.

Figure 6:
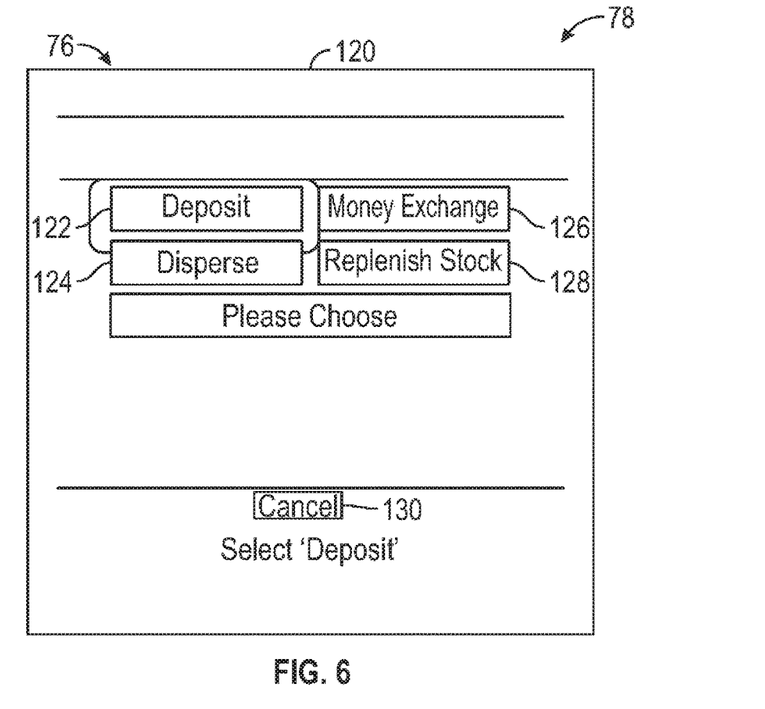
FIG. 6 is an exemplary transaction selection screen that may be displayed on the input/output device of the recycler in accordance with one embodiment of the electronic banking facility of FIG. 4.

Once the user is verified using the account number and password or pin code, for instance, a transaction selection screen 120 is presented on the input/output device 76 permitting the user to select what type of transaction (withdrawal, deposit) the user desires. To facilitate selection of the transaction type, the transaction selection screen 120 of the user interface 78 may be provided with a deposit button 122, a dispense button 124, a money exchange button 126, a replenish stock button 128, and a cancel button 130.

Figure 7:
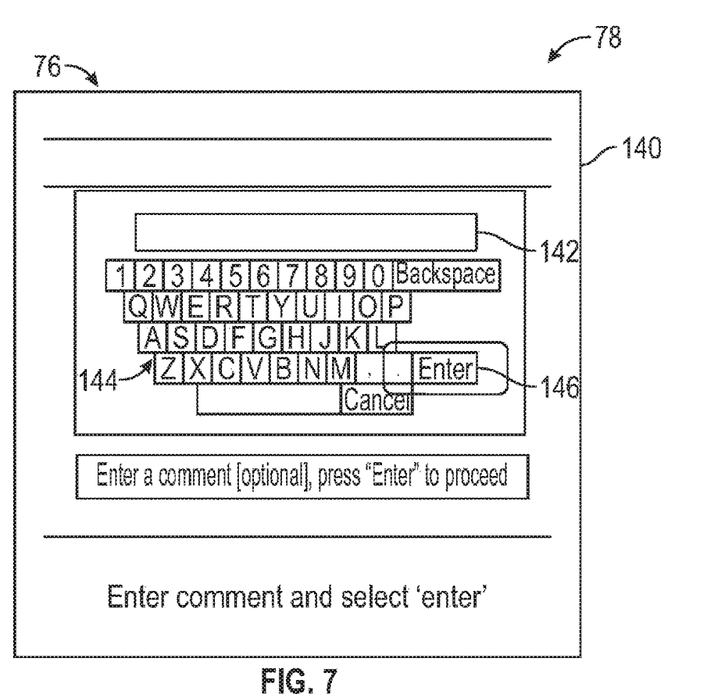
FIG. 7 is an exemplary comment screen that may be displayed on the input/output device of the recycler in accordance with one embodiment of the electronic banking facility of FIG. 4.

Once the user selects a type of transaction on the transaction selection screen 120, a comment screen 140 is displayed in the user interface 78 on the input/output device 76. The comment screen 140 is provided with a comment field 142 that is programmed to allow the user to input a comment to show up on the receipt using an input device such as the keyboard 144, for instance. It should be noted that entering a comment is not required but an option provided to help the user keep track of the transaction. Once the user enters the comment, the user may select an enter button 146 to move to the next screen.

Figure 8:
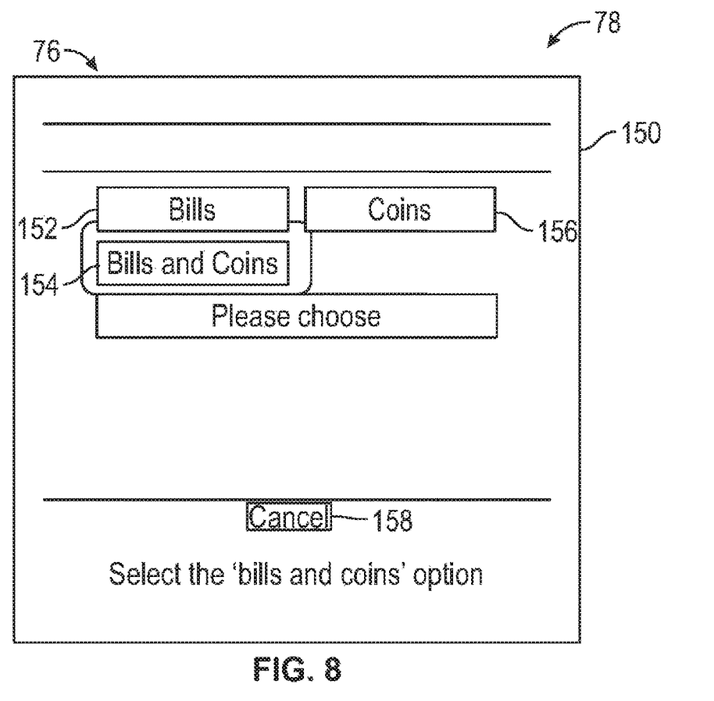
FIG. 8 is an exemplary deposit screen that may be displayed on the input/output device of the recycler in accordance with one embodiment of the electronic banking facility of FIG. 4.

By way of example, if the user selected deposit on the transaction selection screen 120, a deposit screen 150 is displayed in the user interface 78 on the input/output device 76. The deposit screen 150 may be provided with a bills button 152, a bills and coins button 154, a coins button 156, and a cancel button 158. Using the deposit screen 150, the user may select which currency types they are going to deposit. For instance, when only bills are being deposited, the user would select the bills button 152. Likewise, when the user is only depositing coins, the user would select the coins button 156. If the user is going to deposit a mix of coins and bills, the user would select the bills and coins button 154. If the user wishes to cancel the transaction, the user selects the cancel button 158.

Figure 9:
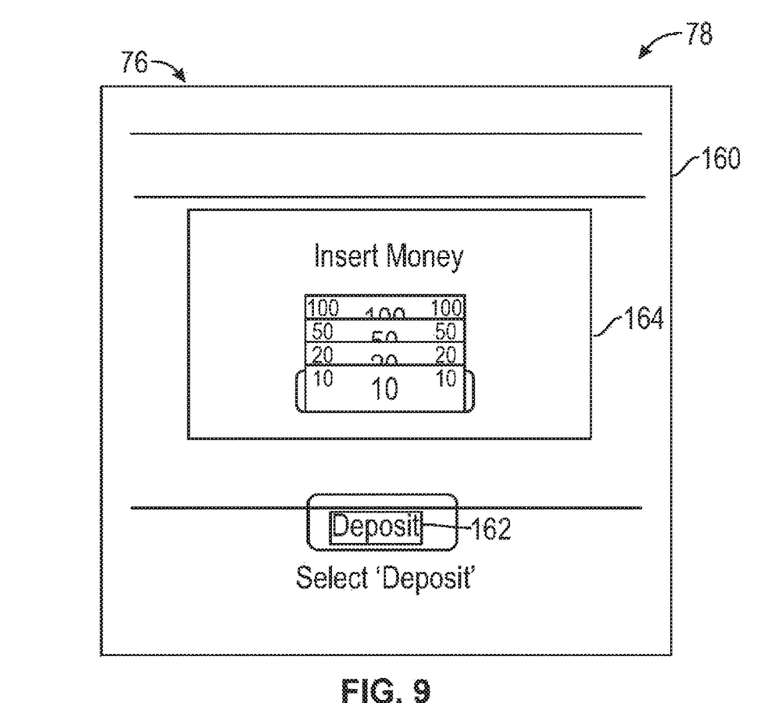
FIG. 9 is an exemplary insert money screen that may be displayed on the input/output device of the recycler in accordance with one embodiment of the electronic banking facility of FIG. 4.

Once the user has selected the types of currency they wish to deposit on the deposit screen 150, an insert money screen 160 is displayed. The user places money (bank notes and/or coins) in the input bin 90 to provide the money to the counter 92 to count the money and convey the money to the vault 88. Once the user places the money in the input bin 90, the user selects a deposit button 162 on the insert money screen 160 to initiate counting of the money. While the user is placing the money in the input bin 90, an instructional graphic such as insert money graphic 164 may be displayed on the insert money screen 160 to instruct the user what to do.

Figure 10:
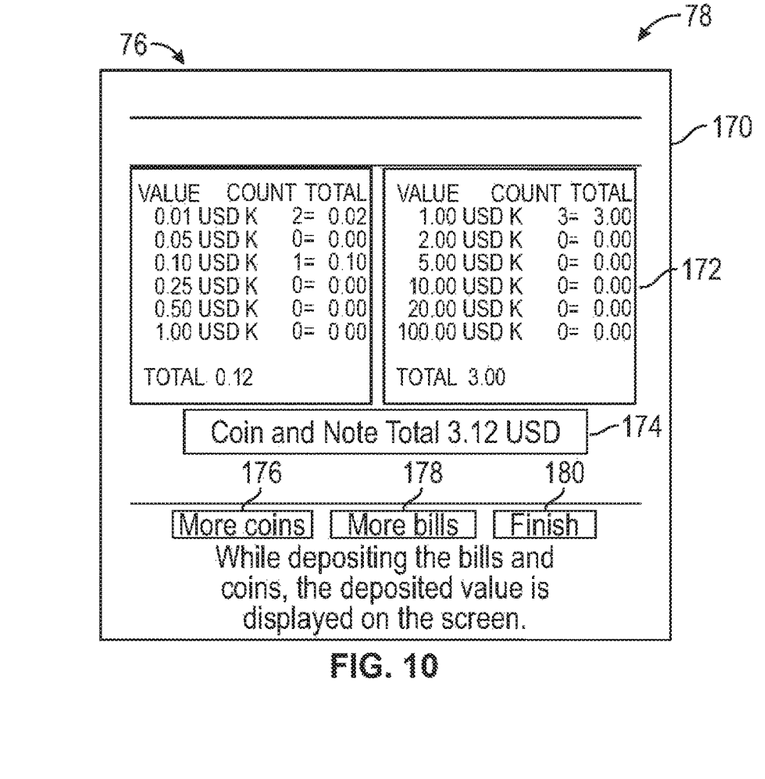
FIG. 10 is an exemplary total screen that may be displayed on the input/output device of the recycler in accordance with one embodiment of the electronic banking facility of FIG. 4

Once the deposit button 162 is selected on the insert money screen 160, the money is counted and the counter 92 signals the control circuitry 75 with the amount and the control circuitry 75 records the deposit in the database 32. To indicate the types and amounts of currency that were placed in the input bin 90, a total screen 170 displays a total number of each type of currency in an accounting section 172. The accounting section allows the user to verify that all of the money they placed in input bin 90 is accounted for. A total amount of money counted by the counter 92 is displayed in the total section 174.

If the user wants to deposit more money, the user may select a more coins button 176 or a more bills button 178. Selecting either the coins button 176 or the more bills button 178 will take the user back to the appropriate screen and allow the user to deposit more money. If the user's deposit is complete, the user may select a finish button 180 to complete the deposit.

Figure 11:
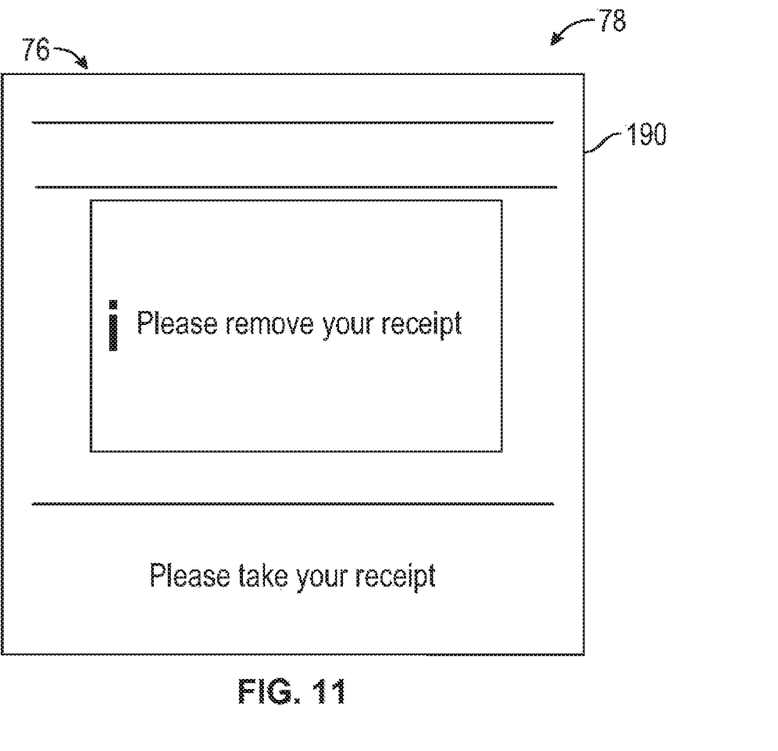
FIG. 11 is an exemplary completed screen that may be displayed on the input/output device of the recycler in accordance with one embodiment of the electronic banking facility of FIG. 4.

When the user indicates the deposit is complete by selecting the finish button 180 on the total screen 170, a completed screen 190 is displayed with an instructional graphic 192 which gives the user further instructions, if necessary. For instance, the exemplary instructional graphic 192 reminds the user to "please remove your receipt."

If the user wants to withdraw money from their account, the user selects the dispense button 124 on the transaction selection screen 120. The recycler 62 allows the user to select the total amount they wish to withdraw as well as the denomination and number of each denomination desired up to the total amount. For instance, if the user wants to withdraw $200 dollars, the user may enter the total amount and then select the denomination of bills they want (e.g. $1, $5, $10, $20, or $100) and number of each denomination. For example, the user may select one $100 dollar bill, two $20 dollar bills, three $10 dollar bills, four $5 dollar bills, and ten $1 dollar bills to equal the total withdrawal amount of $200 dollars. The recycler 62 would then dispense the desired amount in the desired denominations.

If the user wants to exchange denominations, the user selects Money Exchange button 126 on the transaction selection screen 120. The recycler 62 allows the user to exchange currency for different denominations. The deposit screen 150 may be provided with a bills button 152, a bills and coins button 154, a coins button 156, and a cancel button 158. Using the deposit screen 150, the user may select which currency types they are going to exchange. Once the user has selected the types of currency the user wishes to exchange on the deposit screen 150, an insert money screen 160 is displayed. The user places money (bank notes and/or coins) in the input bin 90 to provide the money to the counter 92 to count the money and convey the money to the vault 88. The user then selects the desired denominations to dispense and the number of each denomination to dispense. The recycler 62 ensures the total of the desired denominations are in balance with the total of the money that was place in input bin 90 and then the recycler 62 will dispense the desired denominations.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. An electronic banking system, comprising:
   a host system comprising:
      a first processor and at least one first non-transitory computer readable medium storing a first set of instructions that when executed by the first processor cause the first processor to obtain and store banking records in a database, the banking records indicative of a bank account a user;
   a building having an internal space, and a door providing selective access to the internal space;
   an interactive teller machine located within the internal space of the building, the interactive teller machine connected to an interbank network, the interactive teller machine having an input/output device and a user interface displayed on the input/output device, the user interface having a video camera and a sound system, the user interface programmed to connect the user to a teller located in a remote location via a video chat, the interactive teller machine accessible by the user based on the user having the bank account stored in the banking records in the database;
   a rolled coin machine, accessible by the user based on the user having the bank account stored in the banking records in the database, the rolled coin machine located within the internal space of the building and connected to the host system through a bank network separate from the interbank network;
   a recycler, accessible by the user based on the user having the bank account stored in the banking records in the database, the recycler located within the internal space of the building and connected to the host system through the bank network separate from the interbank network;
   a drop box located within the internal space of the building and connected to the host system through the bank network separate from the interbank network; and
   an entry controller programmed to allow selective entry to the internal space through the door, the selective entry based on the user having the bank account stored in the banking records in the database.

2. The electronic banking system of claim 1, wherein the entry controller is a reader programmed to provide access to the internal space of the building using a debit card, an application on a user device, or a unique code.

3. The electronic banking system of claim 1, wherein the drop box further comprises a sensor configured to cause the drop box to send an alert when the sensor of the drop box has been triggered.

4. The electronic banking system of claim 1, wherein the recycler is provided with an input/output device and a user interface configured to enable the user to perform a desired transaction.

5. The electronic banking system of claim 4, wherein the user interface of the recycler is configured to allow the user to select a total amount for a withdrawal and a number of each denomination desired up to the total amount.

6. The electronic banking system of claim 4, wherein the user interface of the recycler is configured to allow the user to initiate an exchange of currency and/or coins and select a number of each denomination desired up to a total amount to be exchanged.

7. The electronic banking system of claim 1, wherein the rolled coin machine is further provided with a first reader programmed to provide access to the rolled coin machine using a debit card and the recycler and is further provided with a second reader programmed to provide access to the recycler using the debit card.

8. The electronic banking system of claim 1, wherein the interactive teller machine comprises an input/output device displaying a user interface, a video camera, and a sound system, the interactive teller machine configured for video communication between a user and a teller in real time utilizing the user interface displayed on the input/output device, the video camera, and the sound system.

* * * * *